United States Patent [19]
Ricciardi

[11] Patent Number: 5,709,322
[45] Date of Patent: Jan. 20, 1998

[54] DRY SOLIDS METERING SYSTEM WITH MEANS FOR SELF-EMPTYING AND QUICK-EMPTYING/CLEANOUT

[75] Inventor: Ronald J. Ricciardi, Woodcliff Lake, N.J.

[73] Assignee: Acrison, Inc., Moonachie, N.J.

[21] Appl. No.: 569,989

[22] Filed: Dec. 8, 1995

[51] Int. Cl.⁶ .................................................. G01F 11/00
[52] U.S. Cl. .................... 222/227; 222/228; 222/236; 222/272; 222/413
[58] Field of Search .............................. 222/226–242, 222/254, 252, 272, 412, 413, 410; 414/322–325

[56] References Cited

U.S. PATENT DOCUMENTS

| | | |
|---|---|---|
| 767,090 | 8/1904 | Viola. |
| 1,190,673 | 7/1916 | Repp. |
| 1,191,673 | 7/1916 | Davis. |
| 1,651,390 | 12/1927 | Hersman. |
| 1,737,090 | 11/1929 | Meyers. |
| 2,377,069 | 5/1945 | Brubaker. |
| 2,484,929 | 10/1949 | Bressler. |
| 2,674,396 | 4/1954 | Peterson. |
| 2,716,510 | 8/1955 | Massmann ............................ 222/227 |
| 2,782,963 | 2/1957 | Erdmenger ......................... 222/236 X |
| 2,786,609 | 3/1957 | Isserlis ................................ 222/227 |
| 2,800,252 | 7/1957 | Wahl. |
| 2,858,011 | 10/1958 | Wahl. |
| 2,957,608 | 10/1960 | Wahl. |
| 2,991,870 | 7/1961 | Griffith et al. .................... 222/241 X |
| 3,013,701 | 12/1961 | Joschko. |
| 3,067,914 | 12/1962 | Ellaby. |
| 3,079,050 | 2/1963 | Wahl. |
| 3,151,782 | 10/1964 | Wahl. |
| 3,173,583 | 3/1965 | Wahl. |
| 3,177,527 | 4/1965 | Nelson. |
| 3,251,512 | 5/1966 | Irving. |
| 3,305,133 | 2/1967 | Parker ............................... 222/241 X |
| 3,307,748 | 3/1967 | Dunn. |
| 3,363,806 | 1/1968 | Blakeslee et al.. |
| 3,424,350 | 1/1969 | Herr et al. ........................ 222/227 X |
| 3,552,722 | 1/1971 | Sutter. |
| 3,824,937 | 7/1974 | Turner et al. .................... 222/228 X |
| 4,160,514 | 7/1979 | Taupin. |
| 4,171,165 | 10/1979 | Card. |
| 4,487,339 | 12/1984 | Ellwood. |
| 4,611,921 | 9/1986 | Patel. |
| 4,821,782 | 4/1989 | Hyer. |
| 5,188,262 | 2/1993 | Fielding ............................. 222/235 X |
| 5,339,998 | 8/1994 | Warren ............................... 222/241 |
| 5,348,195 | 9/1994 | Pajot. |
| 5,363,747 | 11/1994 | Clark et al.. |
| 5,381,967 | 1/1995 | King. |
| 5,405,049 | 4/1995 | Ricciardi. |
| 5,409,139 | 4/1995 | Daussan et al.. |
| 5,497,907 | 3/1996 | Gmuer et al. .................... 222/227 X |
| 5,499,749 | 3/1996 | Conant ............................... 222/233 |
| 5,524,796 | 6/1996 | Hyer ................................... 222/241 |

FOREIGN PATENT DOCUMENTS

| | | | |
|---|---|---|---|
| 1169704 | 3/1957 | France. | |
| 1489157 | 6/1967 | France ........................... 222/236 |
| 2296582 | 7/1976 | France ........................... 222/236 |
| 2054792 | 5/1971 | Germany ........................ 222/239 |
| 282039 | 4/1952 | Switzerland .................. 222/236 |
| 1646950 | 5/1991 | U.S.S.R. ......................... 222/227 |

*Primary Examiner*—Kevin P. Shaver

[57] ABSTRACT

A sweep arm assembly and cleanout port are provided for a dry bulk materials feeding system. A supply hopper having an outlet is disposed above a chamber such that material may flow from the hopper to the chamber. The chamber has a flat bottom surface. A feed trough is disposed below a slot in the bottom surface of the chamber such that material may flow from the chamber to the feed trough. A sweep arm is disposed in the chamber and located adjacent to the bottom surface. The sweep arm is rotated to "sweep" the material in the chamber to the slot in the bottom surface. Further, a method is provided for feeding dry bulk materials. Material to be fed is loaded into a supply hopper. Material is permitted to flow from the supply hopper into a chamber, which chamber has a flat bottom surface. Material in the chamber is swept into the feed trough. The material is swept into the feed trough by a sweep arm that is rotated in the chamber adjacent to the bottom surface of the chamber. The material in the feed trough then is fed into a process at a controlled feed rate.

48 Claims, 7 Drawing Sheets

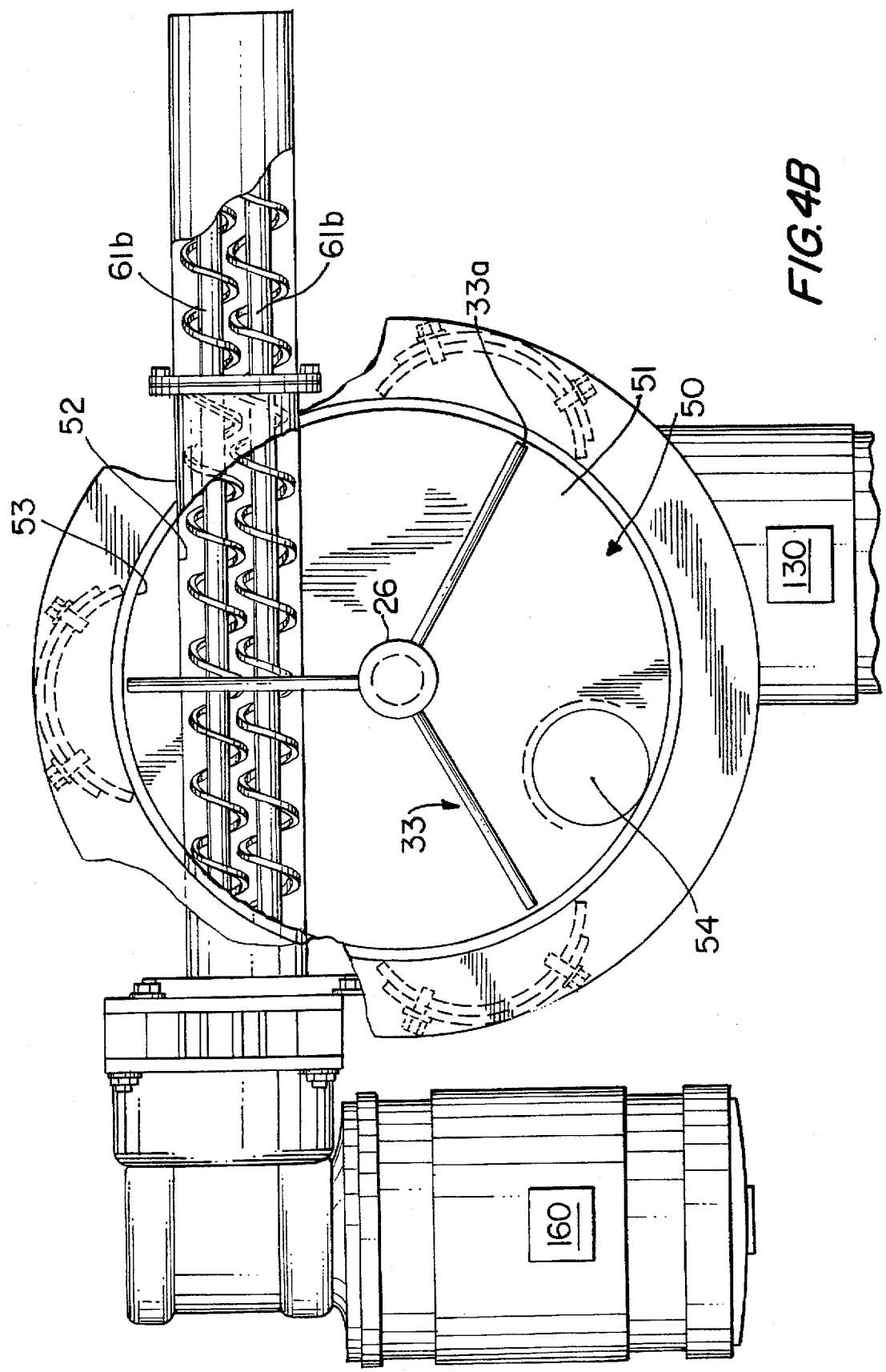

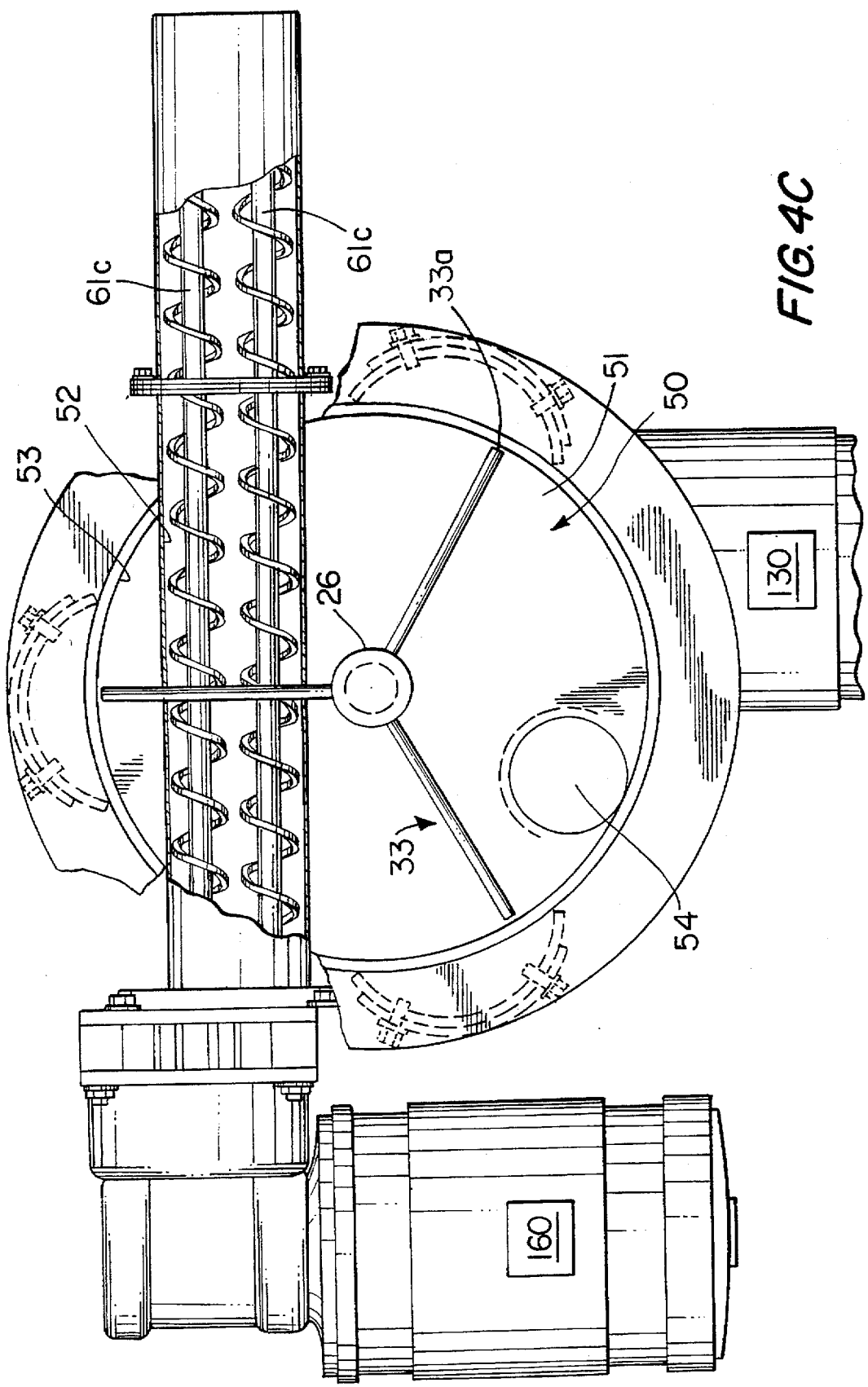

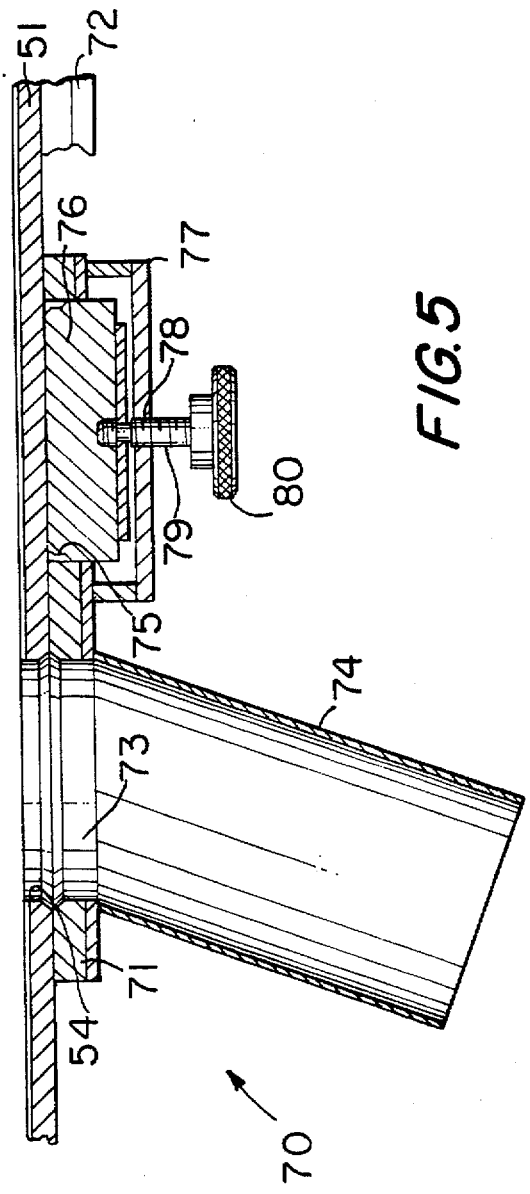
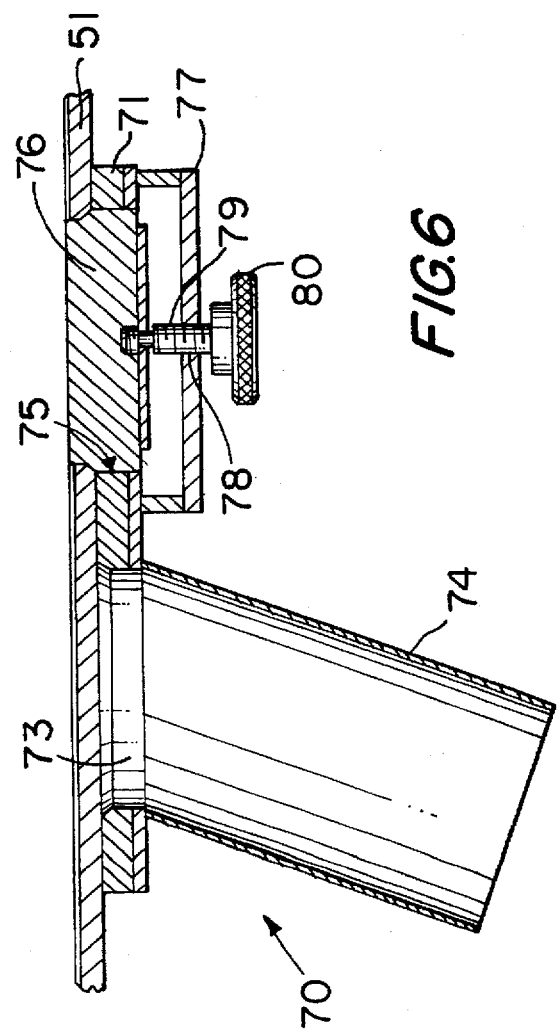

DRY SOLIDS METERING SYSTEM WITH MEANS FOR SELF-EMPTYING AND QUICK-EMPTYING/CLEANOUT

FIELD OF THE INVENTION

The present invention relates to the field of material feeding systems, particularly, dry solids feeders.

BACKGROUND OF THE INVENTION

The precise metering of dry solids such as amorphous powders, is an important and often difficult task in many applications. When such materials are continuously fed into a process, the feed rate at which the material is delivered to the process usually must be accurately controlled to ensure proper formulation and thus, the quality of the end product. Further, the material must be maintained in a controllable condition such that it will feed smoothly, regularly and dependably during operation of the feeder.

One type of dry solids feeding system is a volumetric feeder. As the name implies, volumetric feeders dispense material by volume. They employ a displacement measuring mechanism of some sort operating at a set speed (for example, an auger mounted below a vessel containing material and discharging a fixed volume of material per each auger revolution). This results in feeding a known volume of material. Other dry solids feeding systems are designed to weigh the product, where the weight measurement can be used to control the material feed rate. Such "gravimetric" or weigh feeders include loss-in-weight, weigh belt and weigh auger feeding systems and utilize the appropriate type metering mechanisms that will physically feed the product being weighed.

Some materials, however, have a tendency to bridge, arch or otherwise resist flow out of a container or supply hopper. These conditions result in non-uniform flow into the feeding device. In particular, material may intermittently or permanently arch or "bridge" directly above the feeding mechanism. This condition will cause the material to be fed at a non-uniform rate, on totally stop feeding, thereby adversely affecting operation of the feeding system, and the process into which the feeder is discharging product.

To overcome these problems, the supply hopper of the feeder can be vibrated, causing the material to flow more uniformly and reliably. Further, agitators can be positioned in the supply hopper to eliminate or reduce arching or bridging of the material. There are several drawbacks to these prior art feeding systems. First, even though the material inside the supply hopper may be agitated or induced to flow by these mechanisms, the material directly above the feeding mechanism may still not flow properly into the feeding mechanism, especially if the supply hopper converges to a small outlet and/or if the actual feeding mechanism (i.e., an auger) is located in a converging type chamber which likewise will encourage bridging and/or arching of product. This condition would also adversely affect performance of the feeder.

Second, the amount of vibration and/or agitation in the feeder's supply hopper may not necessarily be related to the amount of material flow required to satisfy the feed rate. In effect, material is generally induced to flow from a supply hopper at the same rate regardless of the feed rate of the feeding mechanism mounted beneath.

With regard to hopper agitators, the drive motor mechanism for a typical vertically installed agitator is often mounted on top of the supply hopper, centrally located. Consequently, the drive mechanism may interfere with the effective filling of the supply hopper, and complicate cleanability of both the supply hopper and agitator. Side mounted, or horizontally operated agitators in a supply hopper present a similar problem with respect to cleanability, but generally do not interfere with filling.

Another drawback to the prior art systems is that they are difficult to thoroughly clean, often requiring complete disassembly. This difficulty may be increased if the agitator cannot be easily removed and/or if the agitator design causes product to "smear" and subsequently adhere to the inside surfaces of the feeder's supply hopper and/or chamber. In addition, product usually accumulates in the unagitated areas within the supply hopper and also adheres to the agitator itself, further complicating cleanout. The residual material in the supply hopper also creates an inefficiency in that not all of the material in the supply hopper can be discharged, leaving a variable quantity of product to be manually removed. Thus, to thoroughly clean out such a supply hopper, water, a vacuum, a brush or some type of liquid pressure cleaning device is usually employed.

SUMMARY OF THE INVENTION

One aspect of the present invention relates to a dry bulk materials feeding system. A supply hopper, having a large outlet, is disposed above a matching chamber such that material may easily flow from the hopper to the chamber in an unrestricted fashion. The non-converging chamber has a flat bottom surface. A feed trough is disposed below a slot in the bottom surface of the chamber such that material may flow unrestricted from the chamber directly into the feed trough. A sweep arm is disposed in the chamber and located adjacent to the bottom surface of the chamber. The sweep arm is rotated to agitate product in the supply hopper to induce flow and to sweep the material in the chamber into the feed trough which contains the feed mechanism.

In accord with another aspect of the present invention, a method is provided for feeding dry bulk materials. Material to be fed is loaded into a supply hopper and into a chamber, which chamber has a flat bottom surface. Material in the chamber is swept into the feed trough located beneath the chamber. Preferably, the material is swept by a sweep arm that is rotated in the chamber adjacent to the bottom surface of the chamber. This sweep arm also agitates product in the supply hopper to induce flow. The material in the feed trough then is fed into a process at a controlled feed rate.

These and other aspects of the present invention will be clear to one skilled in the art from the following description of the invention.

BRIEF DESCRIPTION OF THE DRAWINGS

FIG. 4B is a top view, in partial cut-away, of another embodiment of a material feeding system of the present invention utilizing two intermeshing augers in a feed trough;

FIG. 4C is a top view, in partial cut-away, of a further embodiment of the present invention utilizing two side-by-side augers in the feed trough where the augers do not intermesh;

FIG. 5 is a cut-away side elevational view of a cleanout assembly in the open position for use with the material feeding system of FIG. 1;

FIG. 6 is a cut-away side view of the cleanout assembly of FIG. 5 in the closed position.

DETAILED DESCRIPTION

Figure 1:
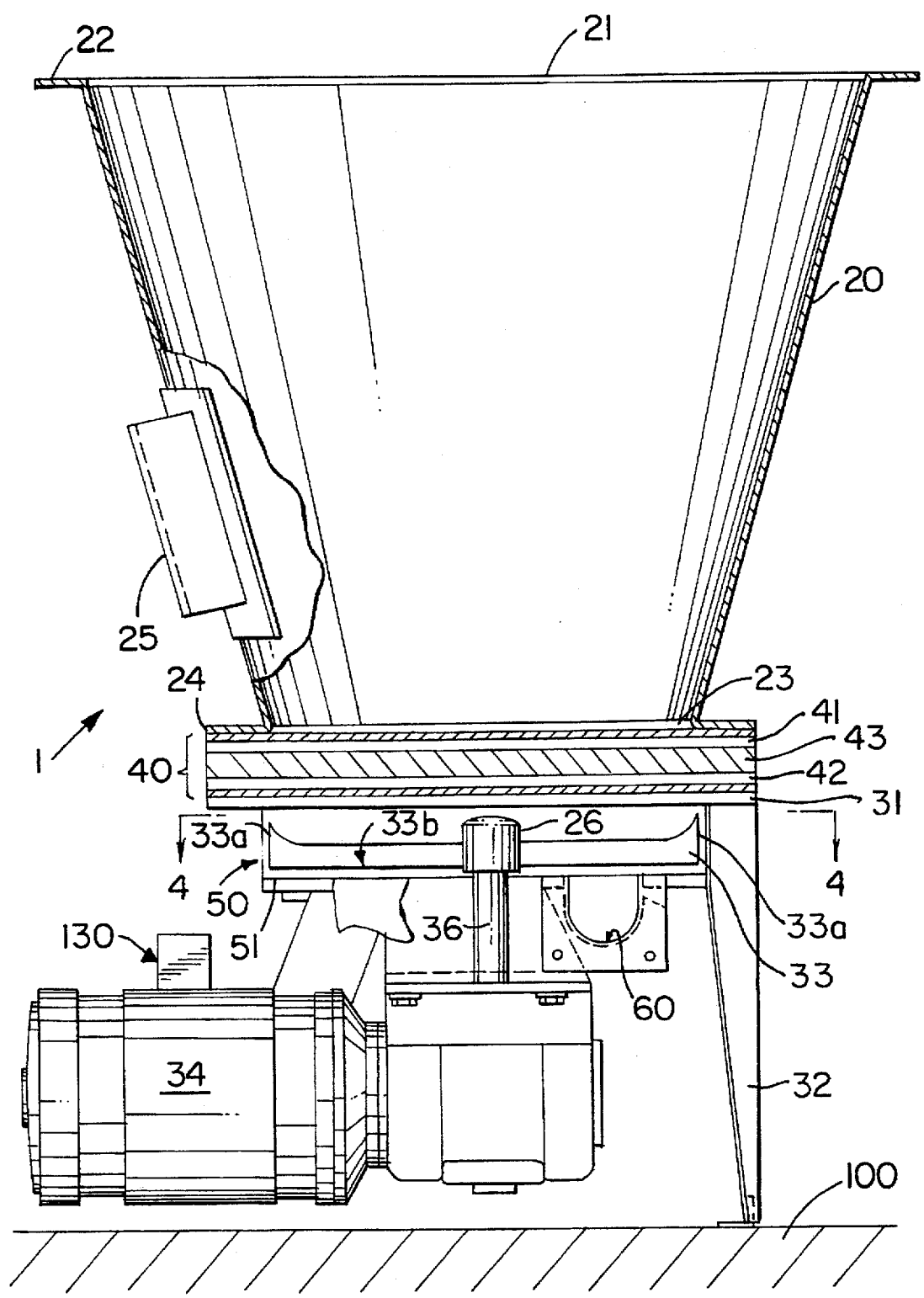
FIG. 1 is a side elevational view, in partial cut-away, of an embodiment of the dry material feeding system of the current invention.

FIG. 1 is a side elevation view of the dry bulk material feeding system 1 of an embodiment of the present invention. Unless otherwise designated, the material feeding system is made of steel. A supply vessel, such as a supply hopper 20, contains material to be fed. A material inlet 21 is disposed at the top of the supply hopper. A material outlet 23 is located at the bottom of the supply hopper. A rim 24 is typically a part of the hopper about the outlet. Generally, these supply hoppers have a steep conical profile and a large outlet to improve the flow of material out of the hopper. Of course, other profiles may be employed and still practice the invention. A vibrator 25 may be mounted to the side of the supply hopper to improve the flow of material through and out of the hopper 20.

The supply hopper 20 is mounted to a chamber 50 at its outlet 23 by an isolation pad 40, such as the isolation pad described in U.S. Pat. No. 5,405,049, which is incorporated in its entirety herein by reference. In particular, a top plate 41 of the isolation pad 40 is attached to the bottom rim 24 of the supply hopper. Flange 31, at the top of chamber 50, is attached to the bottom plate 42 of the isolation pad. The integral gasket 43 of the isolation pad 40, which is made of rubber or other flexible material, isolates and supports the hopper. Legs 32, attached to the flange 31, support the chamber, isolation pad and supply hopper on a base 100. Of course, other methods of disposing the chamber at the outlet of the hopper also would practice the invention. For example, the supply hopper and chamber both could be independently mounted to a frame (not shown) with a sleeve (not shown) directing flow of material from the hopper to the chamber. Alternatively, the supply hopper could be bolted directly onto the chamber.

A feed trough 60 is disposed below the chamber 50. The feed trough 60 may be mounted to the chamber directly, or otherwise maintained in position with respect to the chamber. A feed auger 61 (see FIG. 4A) is disposed in the feed trough and feeds material at a controlled rate. The feed auger is rotated by a motor 64 (see FIG. 4A). As discussed more fully below, a sweep arm assembly 30, having sweep arms 33, is disposed in the chamber to both agitate product in the supply hopper to induce flow and to sweep material into the feed trough.

A sweep arm motor 34 is disposed beneath the chamber 50. A sweep arm motor output shaft 36 is operably engaged to the sweep arm motor 34 and extends into the chamber through the bottom. Preferably, the output shaft 36 is disposed in the center of the chamber. A packing gland or other sealing means may be employed to prevent material from leaking between the chamber and the sweep arm motor output shaft. The speed of the sweep arm motor is controlled by a controller 130 operably engaged to the sweep arm motor. Preferably, the sweep arm motor is mounted directly to the chamber. Of course, other methods of positioning the sweep arm motor would be acceptable. Further, the sweep arm motor may also be positioned elsewhere and the output of the motor transferred to the chamber by any appropriate transmission or gear-reducer. In particular, the output of the feed motor 64 (discussed below) may also be used to rotate the sweep arm assembly.

Figure 2:
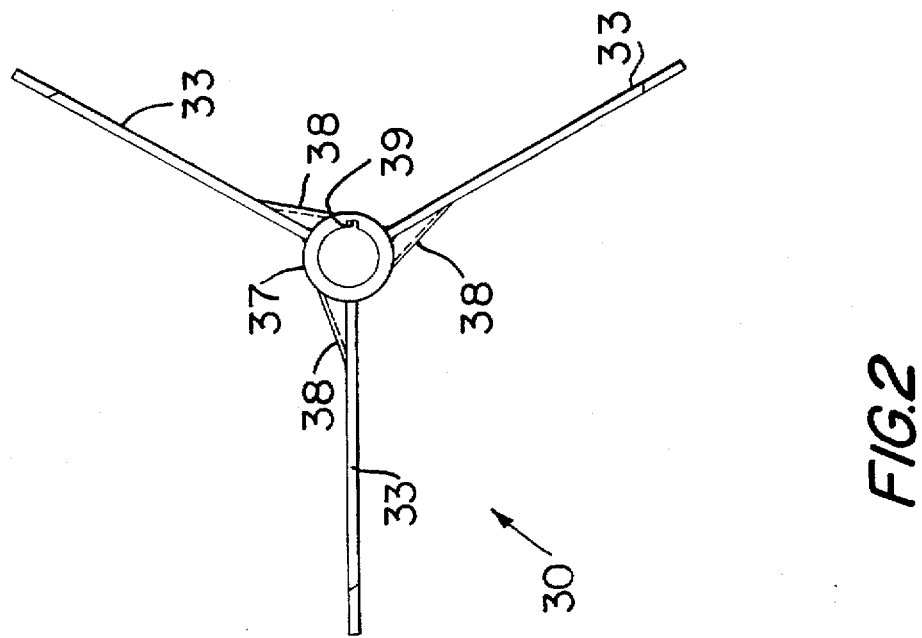
FIG. 2 is a top view of the sweep arm assembly of the material feeding system of FIG. 1.

FIG. 2 is a top view of the sweep arm assembly 30 of the material feeding system 1 of FIG. 1. Sweep arms 33 are mounted to a ring 37, such as by welding. Alternatively, the sweep arms may be integrally formed with the ring. A brace 38 may be mounted to the sweep arms and the ring to stabilize the sweep arms during operation. The interior of the ring contains a slot 39 which engages a key (not shown) on the output shaft 36 (FIG. 1) of motor 34. Consequently, the ring, as well as any sweep arms mounted thereto, rotate with the output shaft 36. Other means of securing the sweep arms to the output shaft could be employed. As shown in FIG. 2, three sweep arms are mounted symmetrically about the ring. Of course, a different number of arms located differently may be employed. A hub 26 (see FIG. 1) is threaded to the output shaft 36 to maintain the ring in position.

Figure 3:
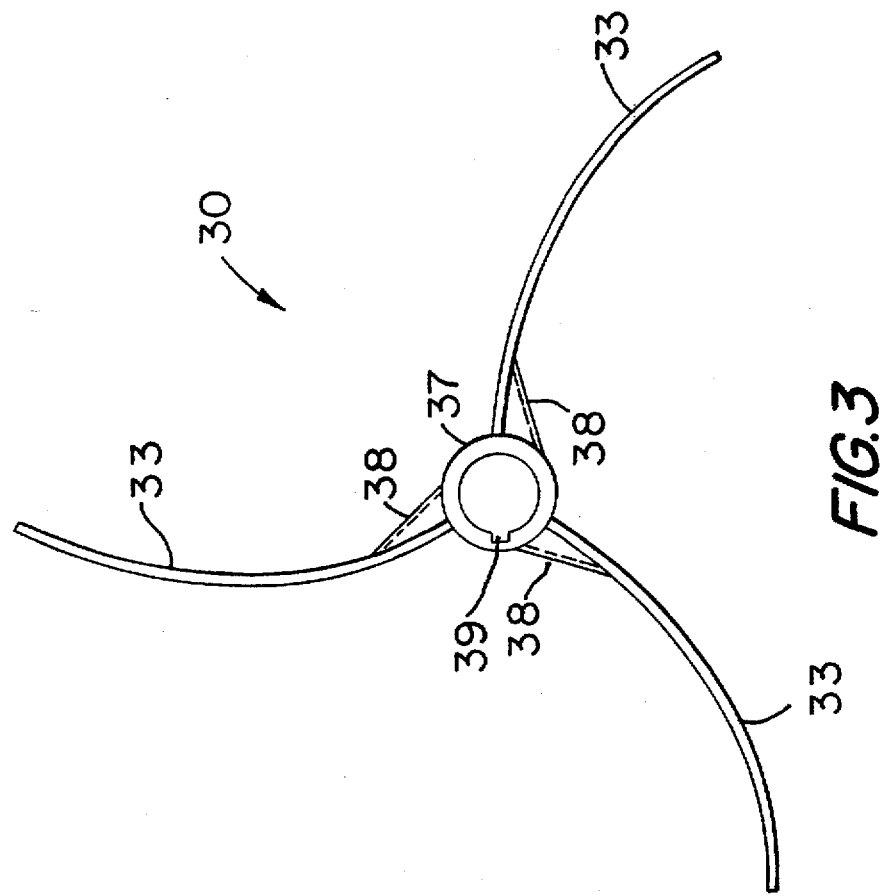
FIG. 3 is a top elevational view of another embodiment of the sweep arm assembly of FIG. 2.

The profile of the sweep arms 33 may be selected in view of the characteristics of the material or materials to be fed. It has been determined empirically that the sweep arms could either have a low profile near the output shaft, which increases toward the outer radius of the arm (see FIG. 1), or vice versa, based on product-handling characteristics. The sweep arm could present a flat, a vertical, or an angled surface to the material, in the direction of rotation. Of course, other profiles can be selected based on the characteristics of the specific material. In particular, the sweep arm may be curved to present a concave or convex surface to the material as seen in FIG. 3, which is another embodiment of the sweep arm assembly 30.

Figure 4A:
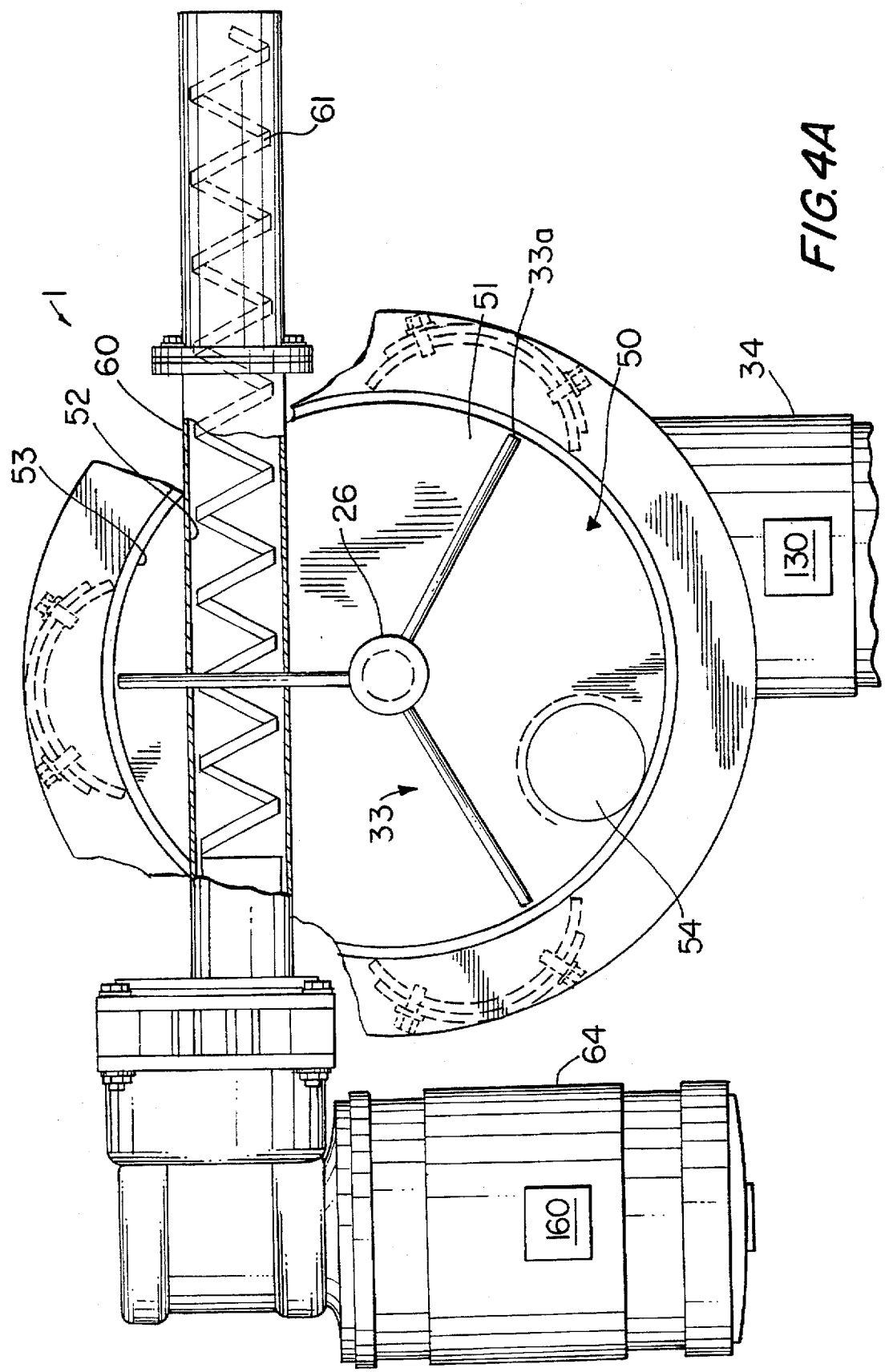
FIG. 4A is a top view, in partial cut-away, of the material feeding system of FIG. 1 from front to back of FIG. 1, along lines 4—4.

FIG. 4A is a top view of the material feeding system 1 of FIG. 1, from front to back. The feed motor 64 is disposed below the supply hopper 20, mounted to the rear of the feed trough 60. An auger, such as a single auger 61 (as shown in FIGS. 1 and 4A) or double augers (intermeshing and/or side by side, as shown in FIGS. 4B and 4C), or other augers known in the art, are operably engaged to the feed motor. Gear reducers and/or other transmission elements may be interposed between the auger or augers and the feed motor, as is known in the art. The speed of the feed motor 64 is controlled in a manner well known in the art, typically by a variable speed controller 160 to produce a desired feed rate. In the FIG. 1 embodiment, there is a distinct motor for both the auger and the sweep arm. However, both the auger and sweep arm could be driven by the same motor.

The interior of the chamber 50 has cylindrical side walls 53 and a flat bottom 51 (FIG. 4A). The walls of the chamber and feed trough can be lined with a Teflon® coating or other non-stick materials or laminations to resist product adhesion. Other materials such as chrome and the like, also may be used to line the inner surface of the chamber for hardness and/or smoothness.

A slot 52 is located in the bottom 51 of the chamber 50 and is positioned directly above the auger 61. The outer radial edge 33a of the sweep arms 33 extend past the slot such that the surface of the slot is completely swept by the arms during operation. Consequently, bridging or arching of product in the supply hopper 20 and at all points in the chamber 50, will be reduced and/or prevented by the action of the sweep arms. In addition, the action of the sweep arms above the slot, effectively fills the feed auger 61, eliminating the possibility of sporadic feed and/or starvation.

The FIG. 4A embodiment utilizes a single auger 61 in the feed trough 60. However, two or more augers may be utilized in the feed trough, depending upon the parameters of the particular feeding application and the handling characteristics of the material to be fed by the system, For example, two intermeshing augers 61b, as shown in FIG. 4B, may be utilized. The intermeshing action of the two augers 61b makes for a smooth product discharge and allows each auger 61b to wipe clean the other auger 61b. Such an arrangement is particularly advantageous when adhesive or sticky materials are being fed. Also, the use of dual augers allows for a higher feed output within a relatively small feed chamber. As is well known in the art, augers 61b can be driven by a common gearing mechanism connected to controller 160, and rotate in directions opposite to one another. The augers 61b may also rotate in the same direction.

Another dual auger configuration is shown in FIG. 4C, where two augers 61c are arranged in a side-by-side arrangement, but not intermeshed. The FIG. 4C arrangement is less costly than the FIG. 4B arrangement. Again, such a side-by-side auger arrangement is well known in the art. The FIG. 4C side-by-side auger arrangement increases and allows for a higher feed output within a small feed chamber. Again, the augers 61c can be driven by a common gearing mechanism connected to controller 160, and are driven in opposite directions of rotation. The augers 61c may also rotate in the same direction.

As shown in FIGS. 1 and 4A–C, each motor 34, 64 is controlled by a distinct controller 130, 160, respectively. Alternatively, both control operations can be performed by a single controller sending signals to each motor. The feed auger controller 160 and the sweep arm controller 130 may be operably engaged such that the speed of the sweep arm 33 is increased or decreased in proportion to the speed of the feed auger motor 64. In particular, the sweep arm motor may be sped up to increase material flow from the supply hopper 20 and chamber 50, when the feed auger motor is sped up, in order to increase the output of product from the feed trough. Alternatively, the sweep arm motor 34 and/or the feed auger motor 64 may operate at a single, fixed speed or at various selectable speeds, determined by the operator based on product characteristics.

As shown in FIG. 1, the bottom edge 33b of the sweep arm 33 is adjacent and parallel to the bottom 51 of the chamber 50. Preferably, there is a tight clearance between the bottom edge 33b and the bottom 51 of the chamber 50 in the order of 0.05 to 0.1 inches. The feed auger 61 is positioned in the feed trough 60, with the top of the auger near the top of the feed trough and thus, near the slot 52. Similarly, the multiple feed augers of FIGS. 4B and 4C are positioned with the top of each auger near the top of the feed trough and the slot 52. The clearance between the sweep arm and the feed auger is the minimal possible, in the range of 0.125 to 0.250 inches. The tight clearance between the sweep arm and the feed auger reduces the likelihood of a starvation condition directly above the feed auger, which is the critical area as product enters (and fills) the feed auger 61. This is especially important when adhesive, cohesive and/or sticky products are being fed.

The chamber 50 preferably has a circular cross-section. The outer radial edges 33a of the sweep arms 33 are adjacent and parallel to the side walls of the chamber 50. Preferably, the radial distance between the ends of the sweep arms and the side wall of the chamber is also 0.05 to 0.1 inches.

The bottom plate 51 of the chamber 50 is flat. A discharge cleanout port 54 may be disposed in the bottom of the chamber 50. As shown in FIGS. 4A, 4B and 4C, the cleanout port has a circular cross-section. Of course, other cross-sections can be employed and still practice the invention. The cleanout port is located at the periphery of the chamber 50 so that the sweep arms effectively push the material to the outlet port, when open, to empty the feeder, regardless of whether the feed auger 61 is operating.

Various types of removable plugs are acceptable to close-off the cleanout port 54. FIG. 5 is a cut-away view of a cleanout port assembly 70 in an open position. FIG. 6 is a cut-away view of the cleanout port assembly 70 of FIG. 5 in a closed position. A sliding plate 71 is held in position against the bottom 51 of the chamber 50 by guides 72. The guides are L-shaped and permit the plate to slide along the bottom of the chamber 50. A first aperture 73 is located in the plate at one end. A chute 74 is mounted to the plate about the first aperture. A second aperture 75 is located at the other end of the plate. A plug 76 is seated in the second aperture. A bracket 77 is mounted to the plate, such as by welding, about the second aperture. A threaded hole 78 is located in the bracket. A bolt 79 is engaged to the plug and threaded to the hole. A knob 80 is mounted to the bolt distal to the plug.

To clean out the feeder (supply hopper and chamber), the sliding plate 71 is displaced by turning the knob 80 until the first aperture 73 is aligned with the cleanout port 54 (as shown in FIG. 5). The sweep arm motor 34 is actuated. Consequently, material is swept by the sweep arm 33 into the cleanout port where it will fall through the chute 74 and out of the feeder.

To close the cleanout port 54, the sliding plate 71 is displaced until the plug 76 is aligned with the cleanout port. The knob 80 is turned, causing the plug to move away from the bracket 77 and into the cleanout port. The outer edge of the cleanout port and the top edge of the plug are beveled such that the plug will easily align itself with the port and seal the port closed, as shown in FIG. 6, flush with the bottom 51 of chamber 50.

To operate the material feeding system I of the present invention, material to be fed is loaded into the supply hopper 2C). Using the feed auger controller 160, an operator selects a material feed rate. The feed auger controller then sends a signal to the feed auger motor 64, activating and controlling the speed of the feed motor. The feed motor drives the auger 61, which feeds material through the feed trough and the discharge spout of the feed trough to the process at the selected rate, in a manner well known in the art.

Simultaneously, the sweep arm is activated, activating the sweep arm motor. The sweep arm motor drives the output shaft 36, which causes the arms 33 to rotate in the chamber 50. As the arms rotate, material in the supply hopper 20 is agitated to induce flow, and material in the chamber 50 is swept into the slot 52 and thus, into the feed trough 60 for feeding by the auger 61.

Typically, the sweep arm will operate at a constant speed. Alternatively, the sweep arm motor can be adjustable to allow the operator to select the speed of the sweep arm. Further, the sweep arm controller and the controller for the feed auger can be linked such that the speed of the sweep arm is proportional to the speed of the feed auger. In such a situation, should the auger speed up, thus feeding more material, the sweep arms will speed up, agitating more product in the supply hopper 20, and sweeping product from within chamber 50 into the feed trough 60 and into the feed auger 61. Further, while two distinct motor 34 and 64 are shown, it should be understood that a single motor may be employed to drive both the feed auger and the sweep arms and still practice the invention. Appropriate transmissions can be employed to control the speed relationship between the feed auger and the sweep arm.

Figure 7:
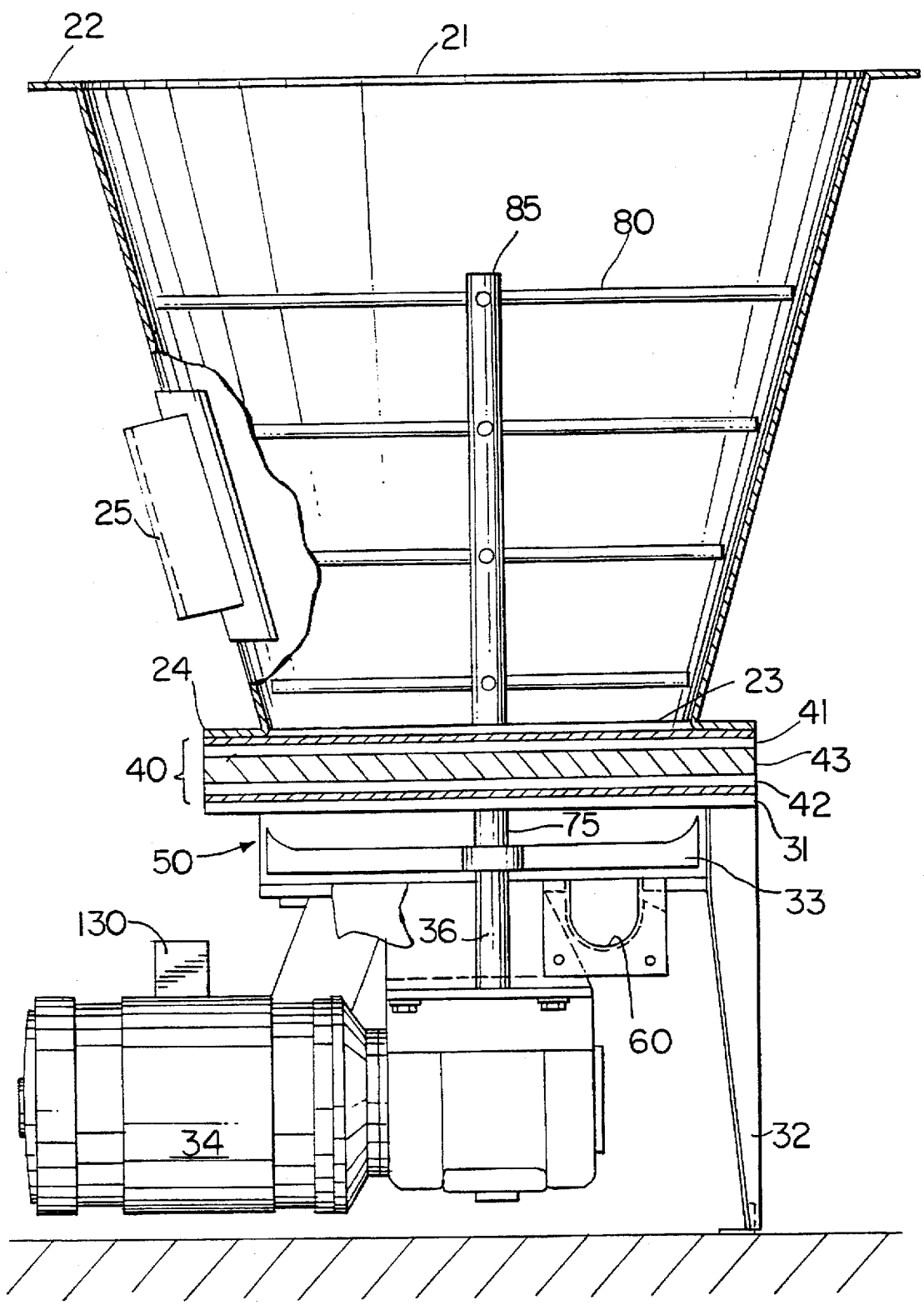
FIG. 7 is a side elevational view, in partial cut-away, of another embodiment of the material feeding system of the current invention.

FIG. 7 is another embodiment of the present invention, where like numerals designate the various elements previously described with regard to FIG. 1. An extension rod 85 is attached to the output shaft 36 of the sweep arm motor 34 and extends up into the supply hopper 20. Agitators 80 are attached to the extension rod and extend out radially. The agitators may have varying shapes and extend in different directions and angles, depending on the material to be fed. In particular, the agitators may have the shape of a curved paddle, agitating the material up or down. Alternatively, the agitators may be a number of rods extending radially in various horizontal planes.

The described preferred embodiment is not intended to limit the scope of the invention which is defined by the following claims:

1. A material feeding system comprising:
   a supply hopper;
   a chamber positioned below the supply hopper, the chamber having a bottom surface, a periphery, a cleanout port located proximate the periphery and a slot located in the bottom surface with a feed trough beneath the slot; and
   a sweep arm disposed in the chamber adjacent to the bottom surface.

2. The material feeding system of claim 1 further comprising an edge disposed along the underside of the sweep arm which edge is parallel to the bottom surface.

3. The material feeding system of claim 1 wherein the interior of the chamber is cylindrical.

4. The material feeding system of claim 1 further, comprising lamination made, of a non-stick material disposed on the bottom of the chamber.

5. The material feeding system of claim 1 wherein the interior of the chamber is lined with a Teflon® coating.

6. The material feeding system of claim 1 further comprising a chute mounted to the chamber at the cleanout port.

7. The material feeding system of claim 1 wherein the cleanout port is located in the bottom surface of the chamber.

8. The material feeding system of claim 7 further comprising a plug selectively engaged to the cleanout port, flush with the bottom of the inside of the chamber.

9. The material feeding system of claim 1 further comprising a sweep arm motor having a shaft, which shaft extends, at least in part, into the chamber and wherein the sweep arm is mounted to the shaft.

10. The material feeding system of claim 9 wherein the shaft extends further upward into the supply hopper, and further comprising agitators mounted to the shaft and disposed in the supply hopper.

11. The material feeding system of claim 9 wherein the sweep arm has a varying profile as it extends away from the shaft.

12. The material feeding system of claim 11 wherein the profile of the sweep arm increases or decreases away from the shaft.

13. The material feeding system of claim 9 further comprising a sweep arm controller for controlling the speed of the sweep arm motor.

14. The material feeding system of claim 13 further comprising:
   a means for feeding material at a controlled rate from the feed trough;
   a feed mechanism motor operably engaged to the feeding means; and
   a feed controller operably engaged to the feed mechanism motor.

15. The material feeding system of claim 14 wherein the sweep arm controller controls the speed of the sweep arm motor based, at least in part, on the speed of the feed mechanism motor.

16. The material feeding system of claim 15 wherein the speed of the feed mechanism motor and the speed of the sweep arm motor are proportionally controlled.

17. The material feeding system of claim 14 wherein the feeding means includes at least one auger positioned in the feed trough.

18. The material feeding system of claim 17 further comprising a first auger and a second auger positioned in the feed trough, wherein the first auger rotates in a direction opposite to the direction of rotation of the second auger.

19. The material-feeding system of claim 18 wherein the first auger and the second auger intermesh with one another.

20. A method of cleaning out a material feeding system having a chamber with a bottom surface, a periphery and a slot located in the bottom surface with a feed trough beneath the slot, said method comprising:
   rotating a sweep arm in a plane parallel to the bottom of the chamber; and
   providing a cleanout port in said chamber such that the sweep arm directs material through said cleanout port to substantially empty said chamber.

21. The method of claim 20 wherein said cleanout port includes a slide plate slidingly mounted to the bottom surface of the chamber, a brace mounted to the slide plate, and a plug displaceably mounted to the brace, said method further comprising:
   moving said plug from a closed position, wherein the plug is flush with the inside bottom of the chamber, to an open position; and
   sliding said slide plate so that said plug is moved away from said cleanout port.

22. An apparatus for feeding material comprising:
   a supply hopper having an inlet and an outlet;
   a chamber disposed at the outlet of the supply hopper, said chamber having a bottom plate, a periphery and an interior wall, wherein a slot is located in the bottom of the chamber and a cleanout port is located in the chamber proximate the periphery;
   a feed trough mounted beneath the chamber along the slot;
   a sweep arm motor;
   an output shaft extending from the sweep arm motor into the chamber; and
   at least one sweep arm mounted to the output shaft proximate the bottom plate.

23. The apparatus of claim 22 wherein the sweep arm has a bottom edge which is parallel to the surface of the bottom plate of the chamber.

24. The apparatus of claim 22 wherein the sweep arm has an outer edge which is parallel to the interior wall of the chamber.

25. The apparatus of claim 22 wherein the sweep arm has a front surface which is flat.

26. The apparatus of claim 22 wherein the sweep arm has a front surface which is concave.

27. The apparatus of claim 22 wherein the sweep arm has a front surface which is at an angle.

28. The apparatus, of claim 22 wherein the sweep arm has a front surface which is convex.

29. The apparatus of claim 22 further comprising a ring wherein the sweep arm is mounted to the ring and the ring is mounted to the output shaft.

30. The apparatus of claim 22 further comprising a means for feeding material from the feed trough and a feed controller for controlling the rate that material is fed from the through.

31. The apparatus of claim 30 further comprising a controller for controlling the speed of the sweep arm motor.

32. The apparatus of claim 31 further comprising means for coordinating the feed controller and the sweep arm motor controller.

33. The apparatus of claim 30 wherein the means for feeding material from the feed trough includes at least one auger positioned in the trough.

34. The apparatus of claim 33 further comprising a first auger and a second auger positioned in the trough, wherein the first auger rotates in a direction opposite to the direction of rotation of the second auger.

35. The apparatus of claim 36 wherein the first auger and the second auger intermesh with one another.

36. An apparatus for sweeping material from a supply vessel into a feed trough comprising:

a chamber having a bottom plate, a periphery, an interior side wall and a cleanout port located proximate the periphery;

a motor having an output shaft which shaft extends into the chamber;

a sweep arm mounted to the output shaft and disposed within the chamber; and an edge disposed along the bottom of the sweep arm adjacent to the bottom plate.

37. The apparatus of claim 36 wherein the edge of the sweep arm is parallel to the bottom plate of the chamber.

38. The apparatus of claim 36 herein the sweep arm has an outer edge that is adjacent to the interior side wall of the chamber.

39. The apparatus of claim 36 wherein the sweep arm has a front face which is at an angle.

40. The apparatus of claim 36 wherein the sweep arm has a front face which is flat.

41. The apparatus of claim 36 wherein the sweep arm has a front face which is convex.

42. The apparatus of claim 36 wherein the sweep arm has a front face which is concave.

43. The apparatus of claim 36 wherein the cleanout port comprises.

a slide plate slidingly mounted to the chamber;

a brace mounted to the slide plate; and a plug displaceably mounted to the brace, wherein the plug is flush with the inside bottom of the chamber when the plug is in the closed position.

44. An apparatus for feeding material comprising:

a supply hopper having an inlet and an outlet;

a chamber disposed at the outlet of the supply hopper, said chamber having a bottom surface, a periphery and an interior wall, wherein a slot and a cleanout port are located in the bottom surface of the chamber;

a feed trough mounted beneath the chamber along the slot; and at least one sweep arm disposed in the chamber proximate the bottom surface;

wherein the cleanout port is located in the chamber such that the at least one sweep arm directs material through said cleanout port to substantially empty said chamber when said cleanout port is unobstructed.

45. The material feeding apparatus of claim 44 wherein the cleanout port is located proximate the periphery of the chamber.

46. The material feeding apparatus of claim 44 further comprising a plug selectively engaged to the cleanout port.

47. The material feeding apparatus of claim 44 further comprising a chute mounted to the chamber at the cleanout port.

48. The material feeding apparatus of claim 44 wherein the sweep arm has a varying profile.

* * * * *

UNITED STATES PATENT AND TRADEMARK OFFICE
CERTIFICATE OF CORRECTION

PATENT NO. : 5,709,322

DATED : January 20, 1998

INVENTOR(S) : Ricciardi

It is certified that error appears in the above-identified patent and that said Letters Patent is hereby corrected as shown below:

Column 1, line 40, delete "on" and insert --or--;
Column 6, line 36, delete "I" and insert --1--;
Column 6, line 38, delete "2C)." and insert --20.--;
Column 10, line 6, delete "comprises." And insert --comprises:--.

Signed and Sealed this

Fifteenth Day of December, 1998

Attest:

BRUCE LEHMAN

*Attesting Officer*   *Commissioner of Patents and Trademarks*